(12) United States Patent
Caruana et al.

(10) Patent No.: US 9,794,625 B2
(45) Date of Patent: Oct. 17, 2017

(54) SYSTEM AND METHOD FOR PRESENTING ACTIONABLE PROGRAM PERFORMANCE INFORMATION BASED ON AUDIENCE COMPONENTS

(71) Applicant: NBCUniversal Media, LLC, New York, NY (US)

(72) Inventors: Michael Caruana, New York, NY (US); Cameron Davies, New York, NY (US); Jason Gilbertson, New York, NY (US); Moinul Haque, New York, NY (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

(21) Appl. No.: 14/941,408

(22) Filed: Nov. 13, 2015

(65) Prior Publication Data

US 2017/0142481 A1    May 18, 2017

(51) Int. Cl.

| | | |
|---|---|---|
| *H04H 60/33* | (2008.01) | |
| *H04N 21/442* | (2011.01) | |
| *H04N 21/81* | (2011.01) | |
| *H04N 21/466* | (2011.01) | |
| *H04N 21/41* | (2011.01) | |
| *H04N 21/24* | (2011.01) | |

(52) U.S. Cl.
CPC . *H04N 21/44222* (2013.01); *H04N 21/44204* (2013.01); *H04N 21/4667* (2013.01); *H04N 21/812* (2013.01); *H04N 21/24* (2013.01); *H04N 21/41* (2013.01)

(58) Field of Classification Search
CPC .......................... H04N 21/24; H04N 21/2407
USPC .............................................................. 725/9
See application file for complete search history.

(56) References Cited

U.S. PATENT DOCUMENTS

| | | | |
|---|---|---|---|
| 8,214,854 B2 | 7/2012 | Zarudyanskiy et al. | |
| 8,745,647 B1* | 6/2014 | Shin | H04N 21/442 |
| | | | 725/10 |
| 2009/0094286 A1* | 4/2009 | Lee | G06Q 30/02 |

\* cited by examiner

*Primary Examiner* — Michael Hong
(74) *Attorney, Agent, or Firm* — Lee, Hong, Degerman, Kang & Waimey PC

(57) ABSTRACT

Systems and methods for presenting actionable program performance information correlated with content are disclosed. A method includes obtaining primary content information related to first content distributed to a plurality of viewers during a particular time duration; obtaining secondary content information related to the first content, wherein the secondary content information includes information identified based on the first content; obtaining activity information of the plurality of viewers of the first content during the particular time duration; determining a plurality of activity component information corresponding to a plurality of activity categories; storing the plurality of activity component information to be associated with the first content; and displaying data of at least one of the plurality of activity component information at a first time point along with the first content.

19 Claims, 10 Drawing Sheets

SYSTEM AND METHOD FOR PRESENTING ACTIONABLE PROGRAM PERFORMANCE INFORMATION BASED ON AUDIENCE COMPONENTS

BACKGROUND

Collecting and utilizing information regarding media consumption activities and habits of audience members has long been an important goal for content distributors and creators, as well as advertisers. Having information on what programming content is being watched, as well as information on who is watching them, is often used as a starting point for determining programming ratings, and in turn, the relative values of advertisement placement during one programming content over another.

Collecting audience data included surveying a sample group comprised of randomly chosen viewers. Target audience members of the sample group would self-report their viewing history or habits over a determined period of time. Audience data gathering systems evolved with technological advancements to include set meters which were installed in viewers' homes and connected to televisions or other media consumption devices. These set meters recorded and collected the viewing habits of the viewer and transmitted them to a central database and server where the information was collected and analyzed.

Other implementations have also been developed with the advent of new media delivery channels and the increase in data collection capabilities. Particularly, some existing viewer information systems include the capability to analyze ratings information on increasingly granular levels, including daily, hourly, quarter-hourly, minute-by-minute, and even second-by-second bases. These systems may further include the ability to analyze audience gains including tune-in (turning on a television) and switch-in (changing from another channel) (collectively discussed herein as tune-in), and tune-out (audience losses, also referred to as retention) event information, which provides information regarding the time at which certain viewers tuned-in to, or tuned-out from, the particular programming.

The information provided by these known systems has been valuable in evaluating the success and appeal of certain programming content, as well as determining values for advertising time related to the programs. These and other existing data collection and analysis systems however, have been limited to providing only fundamental information on what programming content is being consumed, when it is being consumed, and in some advanced cases, who is watching. It has also failed to remove random movement from the analyzed data, where viewers who tune-in to a program purely by chance—without knowing what program they are tuning-in to—are analyzed in the same manner as another viewer who intentionally tuned-in to the program based on knowledge of the content.

For example, FIG. 1 shows a chart 100 of program ratings information provided for a particular content provider for a period of one month in September, according to an audience measurement system of the related art. This extremely broad view of the data shows only the average net impressions, or the average number of viewers that watched a given program broadcast on a given day. While this type of information may be useful in charting the overall numbers of viewers who at one point or another was exposed to each particular program, it lacks any information as to specifics of viewing patterns, viewing habits, or context to the numbers with respect to the actual content being presented during each program. Where two programs may be similar in content or presentation time, this lack of detailed information may make it difficult for content providers and creators to understand the reasons behind disparities in audience data from one program to another.

FIG. 2 shows a more detailed graph 200 providing a view of audience data during the presentation of a particular Program 1 discussed in FIG. 1 according to a more granular view of the same audience measurement system of the related art. This view graphs the number of net impressions throughout the duration of the presentation at one minute increments, including descriptions of various distinct segments of the program itself. For example, in the case of a talk show, Program 1 may be comprised of 6 content based segments, where each segment is identified by a guest of the talk show or a particular topic discussed during the talk show. Therefore in addition to a line 207 charting the progression of net impressions throughout the duration of the program, the graph 200 may include descriptors 201-206 of each segment, providing a visual correlation between a change in the net impressions and the corresponding segment presented at the time of the change.

While this type of detailed view shown in FIG. 2 provides much more information for content distributors for understanding the context behind a program's rating numbers, the graph of FIG. 2 still fails to present sufficient granularity for content distributors—and in particular, content creators—as to the true context driving the viewing numbers. Measurement of changes in net impression may also not take into context various factors for significant changes, such as lead-in (viewership due to a program that immediately precedes another program), seasonality (viewership attributable the day of the week and month of the year), and non-content related tune-out (drop in viewership attributable to a non-content related factor), thus creating skewed and unreliable data. For content distributors, and particularly for content creators, the lack of context provided by existing audience measurement systems, even when charted on a minute-by-minute basis, reduces the information's value and prevents confident action in distributing or creating content with the purpose of improving the content and generating high viewership ratings.

Thus, the existing systems and methods have been unable to provide meaningful information as to the context surrounding the audience data provided, and therefore the existing systems have thus far been limited in value to entities such as content creators or content providers for gaining a detailed and reliable understanding of viewer behavior. Therefore, it may be advantageous for a system to present actionable program performance information which includes data related to a correlation between the content being consumed and components of the audience data collected.

SUMMARY

Embodiments of the present disclosure include a system and method for presenting actionable program performance information within the context of corresponding content. An embodiment of a method according to the present disclosure may include obtaining primary content information related to first content, wherein the first content is distributed to a plurality of viewers during a particular time duration and the primary content information comprises audio and video of the first content, obtaining secondary content information related to the first content, wherein the secondary content information comprises information identified based on the first content, obtaining activity information of the plurality of viewers of the first content during the particular time duration, determining a plurality of activity component information corresponding to a plurality of activity categories based on the primary content information and the secondary content information, storing the plurality of activity component information to be associated with the first content, and displaying data of at least one of the plurality of activity component information at a first time point within the particular time duration along with the first content at the first time point.

Another embodiment of a method according to the present disclosure may include displaying a reproduction of first video content with first activity information for a presentation duration of the first video content, displaying a reproduction of second video content with second activity information for a presentation duration of the second video content, wherein the first activity information corresponds to a graphical representation of audience retention during presentation of the first content and the second activity information corresponds to a graphical representation of audience retention during presentation of the second content. The first content and the second content may be displayed simultaneously.

Other embodiments of the present disclosure may include a system including a memory configured to store information, a receiver configured to receive information, and one or more controllers. The one or more controllers may be configured to receive primary content information related to first content via the receiver, wherein the first content is distributed to a plurality of viewers during a particular time duration and the primary content information comprises audio and video of the first content, receive secondary content information related to the first content via the receiver, wherein the secondary content information comprises information identified based on the first content, receive activity information of the plurality of viewers of the first content during the particular time duration via the receiver, determine a plurality of activity component information corresponding to a plurality of activity categories based on the primary content information and the secondary content information, cause the memory to store the plurality of activity component information to be associated with the first content, and output data of at least one of the plurality of activity component information at a first time point within the particular time duration along with the first content at the first time point. The system of some embodiments may include a display, and the one or more controllers may be configured to output the data via the display.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for presenting actionable program performance information based on audience components. In this discussion, the term program will be used primarily with respect to television programs, however, various applications of the systems and methods disclosed herein to other media are contemplated, including, but not limited to radio, digital video recorder media, internet radio, internet video, internet streaming content, recorded media, virtual reality content, and the like.

Figure 1:
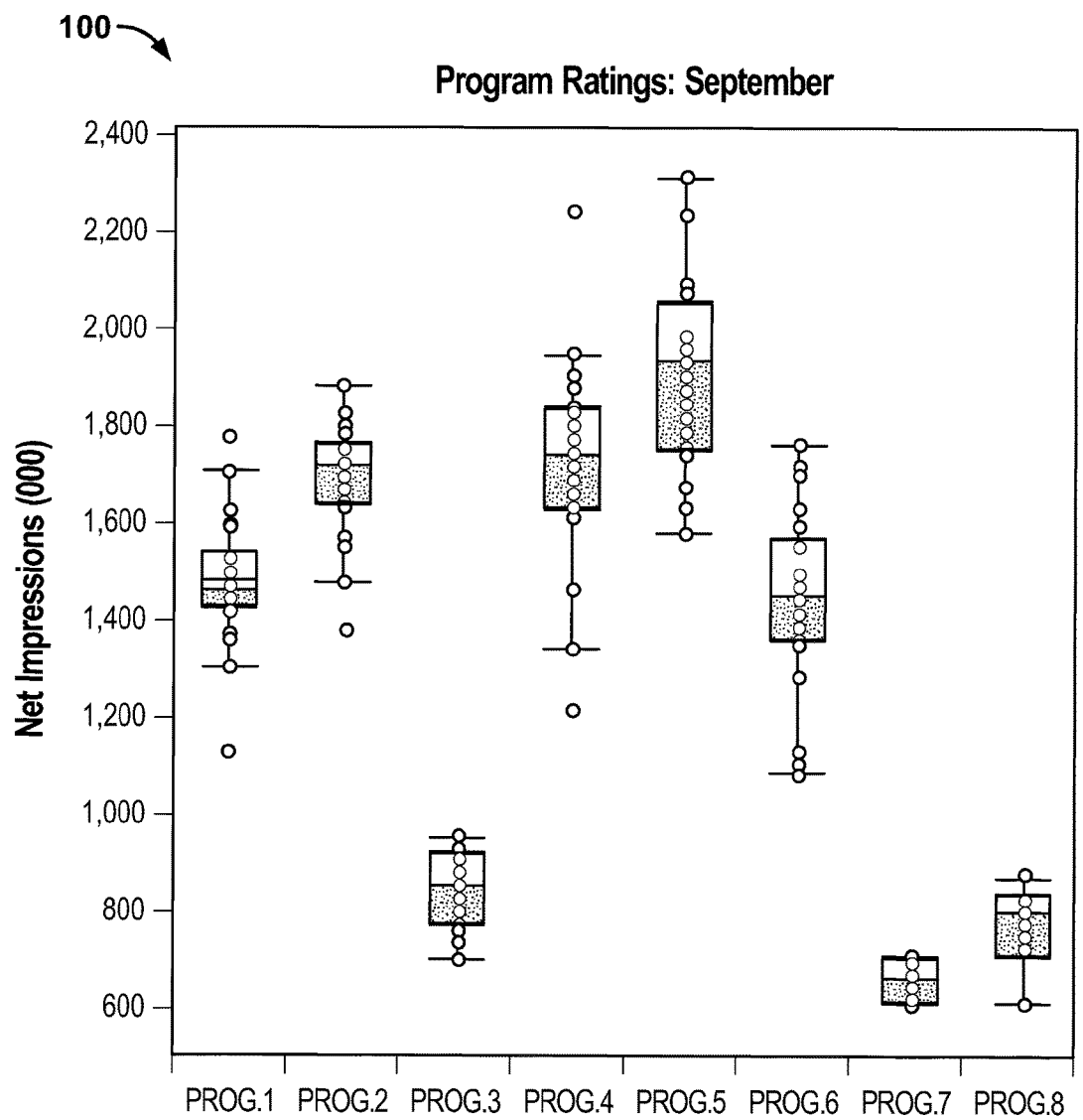
FIG. 1 is an illustration of program ratings information provided for a particular content provider, according to an audience measurement system of the related art.
Figure 2:
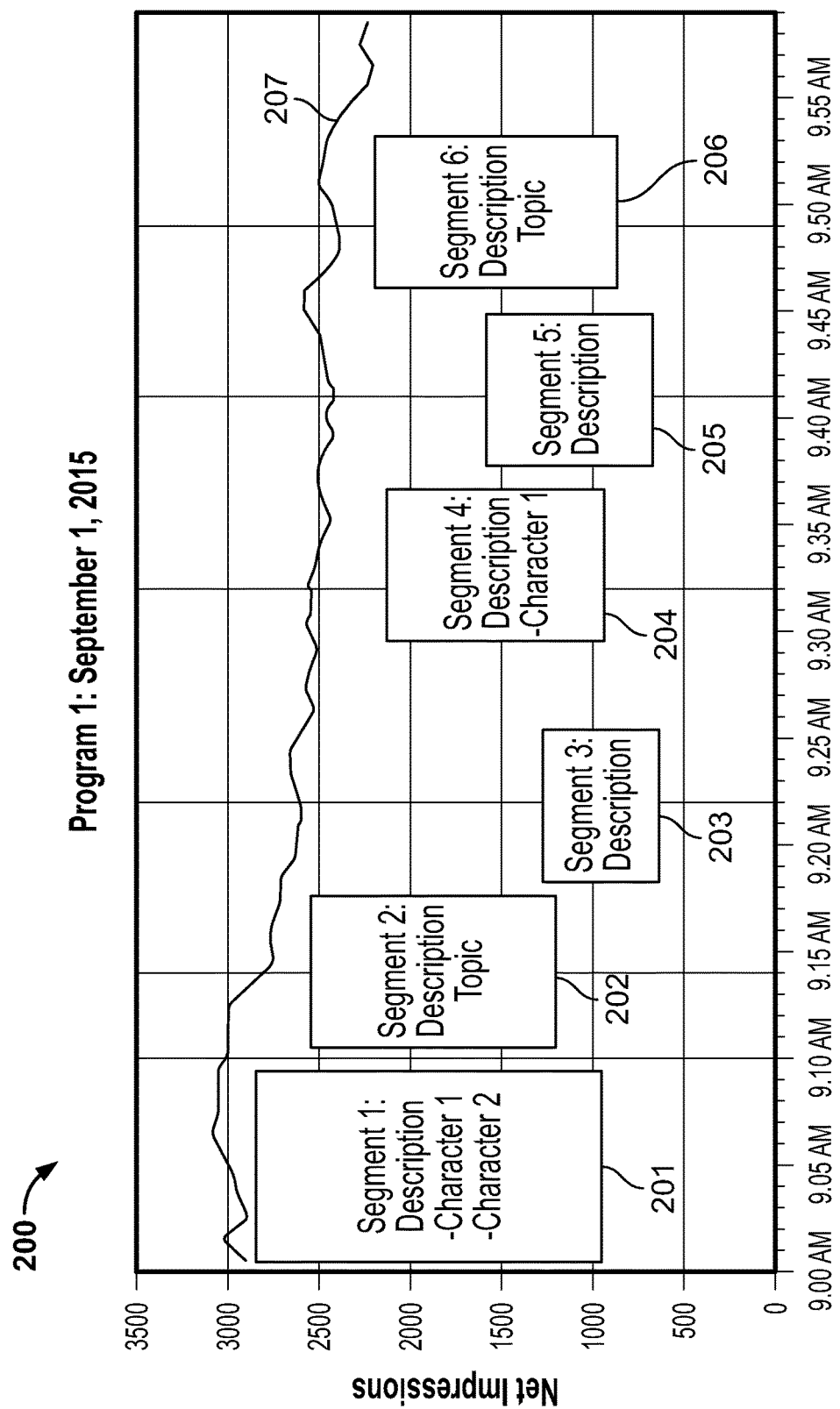
FIG. 2 is an illustration of audience data during the presentation of a particular program according to the audience measurement system of FIG. 1.
Figure 3:
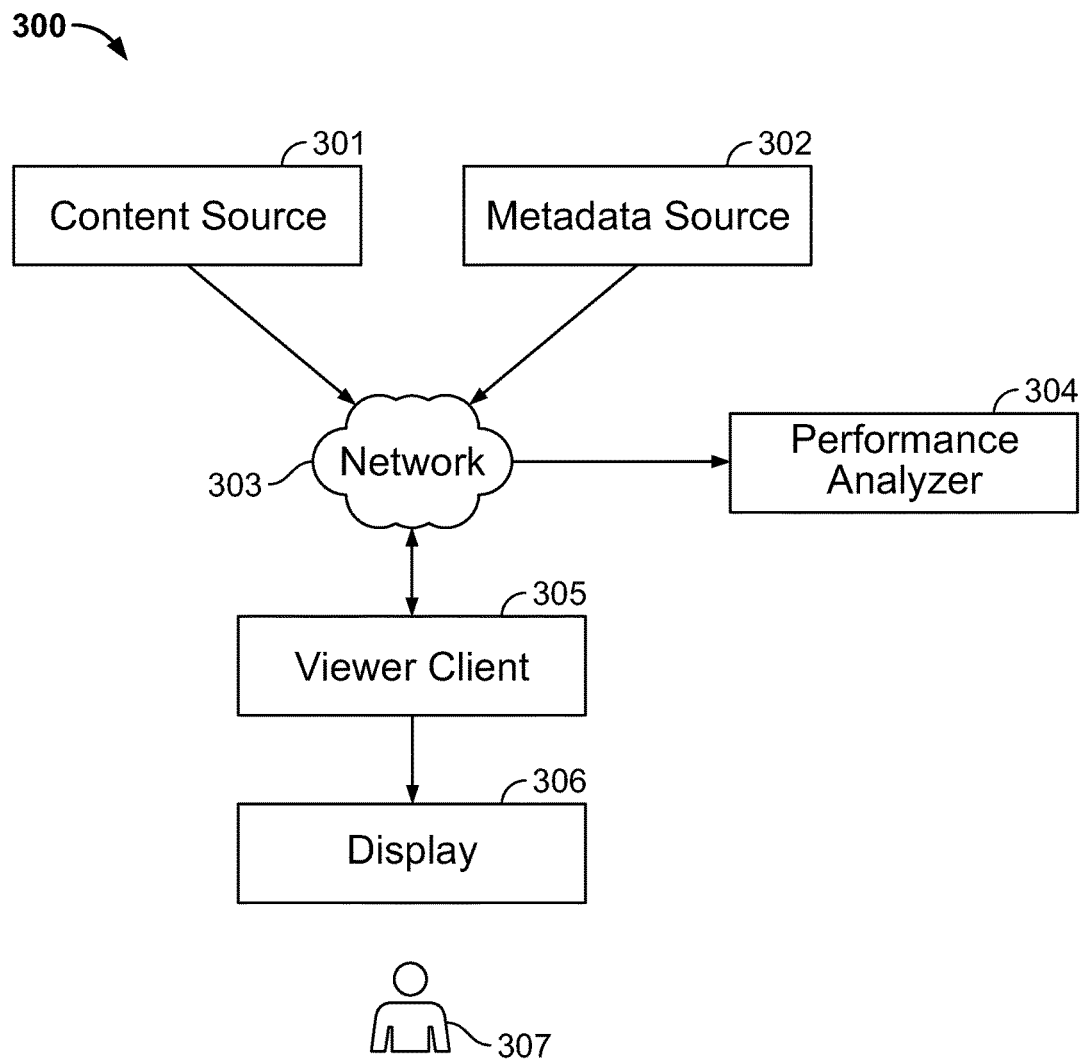
FIG. 3 is an illustration of a system for presenting actionable program performance information according to an embodiment of the present disclosure.

Referring now to FIG. 3, an embodiment of a system 300 for presenting actionable program performance information is shown. The system 300 may include a content source 301 configured to provide programming content to a viewer client 305 via a network 303. In some embodiments, the network 303 may include various systems for distribution of content including any desired combination of hardwired and wireless communication links, including over-the-air broadcast, cable, internet, other network connection systems, and the like, which implement networks and hardware known and used in the related art, including broadcast technologies, cable or satellite content distribution systems, internet protocol (IP), LAN, or other networked technologies, and the like, wherein examples of the distributed programming content include live and recorded television, movies, online content, music, radio or other audio-visual content, and the like. In one embodiment, the content source 301 may correspond to a cable television headend receiving various television content signals and distributing content signals corresponding to channels of the various television content signals.

The system 301 may further include a metadata source 302 configured to store and provide metadata to the viewer client 305, where the metadata is related to the programming content provided by the content source 301. The metadata stored and provided by the metadata source 302 may be created and maintained by the same entity that creates and maintains the programming content, or in other embodiments they may be different entities. In the embodiment shown, the metadata source 302 is configured to provide metadata information to the viewer client 305, however in other embodiments, the metadata may be provided to the content source 301 or related terminal directly for packaging and transmission along with the programming content to the viewer client 305.

The viewer client 305 may be connected to the content source 301 and/or the metadata source 302 via the network 303. The viewer client 305 may include any terminal or system configured to receive a content signal, and in some embodiments, the viewer client 305 may be configured to decode the content signal and prepare the signal for presentation of the content to a user 307 via an output such as a display 306, audio speaker, or the like. In some embodiments, the viewer client 305 may also be configured to transmit information via the network 303 regarding the content programming consumed by the user 307, such as a particular television channel or television program consumed by the user 307.

For example, implementations of the viewer client 305 may include televisions, desktop computers, laptop computers, tablet computers, mobile smartphones, personal media devices, cable set top box receivers, satellite television receivers, and the like. In other embodiments, the viewer client 305 may be implemented in more than one connected device. For example, the viewer client 305 may include a dedicated set top box configured to receive and decode content signals for presentation by the display which is connected to a separate viewing meter, such as a Local People Meter (LPM) implemented by Nielsen Corporation. The viewing meter, such as the LPM, may be configured to collect viewer information of the user 307 consuming the content programing, where the viewer information includes demographic information such as age, sex, ethnicity, occupation, education level, and the like, and record the viewing history or habits of the user 307 based on the content signals decoded and presented by the set top box. The viewing meter, or collectively the viewer client 305 as shown in FIG. 3, may then transmit the collected audience data back to a server and database for collection, storage, and analysis.

In the embodiment of FIG. 3, the system 300 further includes a performance analyzer 304 connected to the network 303. The viewer client 305 may transmit the audience data directly to a performance analyzer 304 via the network 303, or the viewer client 305 may transmit the audience data to a server and database (not depicted) maintained by a third party, such as an audience measuring entity such as the Nielsen corporation, and the third party may then provide the audience data to the performance analyzer 304 via the network. The performance analyzer may also receive information related to the content programming from the content source 301 and related metadata information from the metadata source 302. However, in other embodiments, the performance analyzer may receive the audience data, content programming information, and metadata information from the viewer client 305 via the network 303. In certain embodiments, the performance analyzer 304 configured in accordance with the features and aspects disclosed herein may be configured to operate within or support a cloud computing environment. For example, a portion of, or all of, the performance analyzer 304 may reside in a cloud server.

Embodiments of the performance analyzer 304 may be configured to collect the audience data, content programming information, and metadata information and normalize the audience data based on various factors, including content-related factors as well as non-content related factors, to be discussed further below. The performance analyzer 304 may normalize the audience data to identify the changes in the data attributable to various components of the programming performance, including seasonality, lead-in, content related tune-in, non-content-related tune-in, and content and non-content related tune-out also referred to as viewer retention.

In some embodiments, the performance analyzer 304 may also assign performance grades to each item of programming content in relation to normalized audience data for one or more other comparable or competitive programming content. The performance analyzer 304 may also provide alerts for a significant event, such as a substantial increase or decrease in viewing data, such as a sudden drop in viewer retention. The alert may include information regarding the event, as well as contextual information such as text, audio, video, character information, topic information, or the content itself corresponding to the event. The normalized audience data, alert information, and any other information generated by the performance analyzer 304 may be stored in a combined database (not depicted), configured to store data for review, presentation, analysis, and further use by the performance analyzer. The combined database and the performance analyzer may be implemented using any number and/or types of suitable processors, volatile and non-volatile memory systems, and/or data storage apparatuses, and the like, and may further include hardware required to implement the combined database, including server terminals, remote terminals, network hardware, and the like.

In some embodiments, the performance analyzer 304 may also be connected or otherwise be operably coupled to a display configured to display information, such as an LED or LCD display. In other embodiments, the performance analyzer 304 may be connected to a server computer or implement server computer hardware itself, to communicate information to a client terminal (not depicted) via the network 303. It will be understood by those of ordinary skill in the art that the various components and aspects of the system 300 and in particular the performance analyzer 304 may be implemented in different configurations and arrangements, including cloud computing implementations, which contemplate receiving, transmitting, and otherwise communicating data, content, instructions, and the like, between one or more, or all, of the components of the system 300 via the network 303. Further, the performance analyzer 304 may be implemented with known and existing audience measurement systems, thereby improving functionality of the various audience measuring methods and systems of the audience measurement industry.

Figure 4:
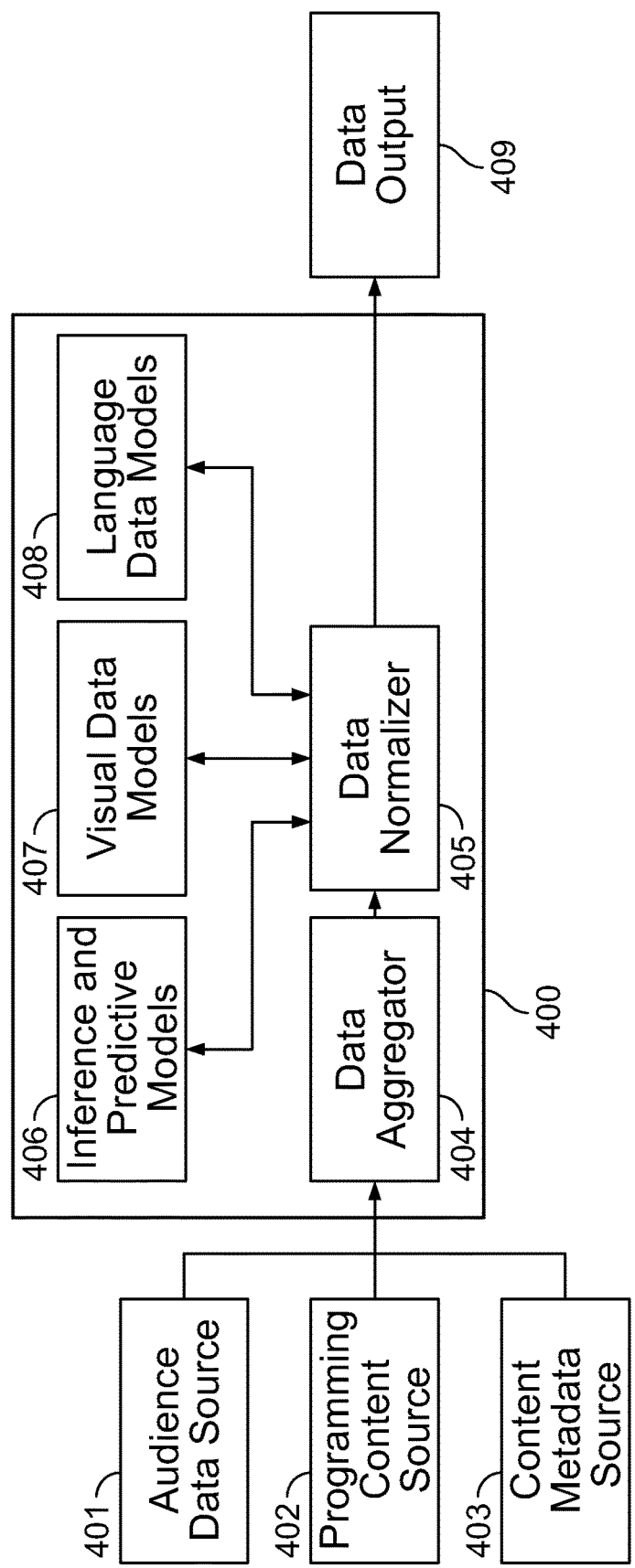
FIG. 4 is an illustration of an aspect of the system for presenting actionable program performance information according to an embodiment of the present disclosure.

Referring now to FIG. 4, an embodiment of the performance analyzer 400 is shown. As previously discussed, the performance analyzer 400 may receive audience data from an audience data source 401, which may include set top boxes, computers, Nielsen ratings devices, and the like as discussed. The performance analyzer 400 may receive programming content from a programming content source 402, which may include a cable television headend, internet streaming content distributor, or a viewer client such as a set top box, and the like as discussed. The performance analyzer 400 may also receive content metadata from a content metadata source 403, which may include a server and metadata database maintained by a third party, the programming content source 402, or the viewer client, and the like as discussed.

The received information may be aggregated and cleaned by a data aggregator 404 of the performance analyzer 400. The data aggregator 404 may detect, correct, and/or remove corrupt, inaccurate, incomplete, or irrelevant data from the received information. For example, the data aggregator 404 may receive the programming content from the programming content source 402 along with data of the content or the content format, such as encoding information, frame rate information, resolution information, play duration, pre-roll, mid-roll or post-roll information, and the like. The programming content may be received in the form of an actual content file, such as a video file in formats including .ts; .flv; .vob; .avi; .wmv; .asf; .rmvb; .mp4; .mpg; .m4v; 0.3gp; and the like, or information of the programming content may be received in the form of a pointer or URL indicating a location where the programming content is available for retrieval. The data aggregator 404 may store the received programming content or related information in a relational database table, or other data storage model, and assign or store a preexisting identifier, such as primary key, to uniquely identify the programming content.

The content metadata received from the content metadata source 403 may include inaccurate, incomplete, or corrupt information which is removed from the data, and the metadata may also include metadata information which is not relevant or of interest in the performance analysis process. For example, the metadata information may include data of the programming content such as year of release, copyright information, production information, network information, and the like, which may not provide relevant data in the analysis of audience performance. The metadata may be cleaned of any irrelevant data points and the remaining cleaned metadata may be stored in a relational database table or the like including an assigned or created primary key identifying the content associated with the metadata.

Similarly, the data aggregator 404 may perform data cleaning using the audience data received from the audience data source 401. The audience data may also include inaccurate, incomplete, or corrupt information which is removed from the data by the data aggregator 404, and may further include audience data which is not relevant or of interest in the performance analysis process. For example, the audience data may include file format information, audience data entity information, audience meter device information, audience location, and the like, which may not provide relevant data in the analysis of audience performance. The audience data may be cleaned of any irrelevant data points and the remaining cleaned audience data may be stored in a relational database table or the like including an assigned or created primary key identifying the content associated with the metadata.

The cleaned data may be provided to the data normalizer 405 which is connected or operably coupled to a predictive models unit 406, a visual data models unit 407, and a language data models unit 408. The model units 406, 407, 408 may be configured to analyze, store, and provide contextual data to the data normalizer 405 for analysis of the audience data, programming content data, and the content metadata. These model units 406, 407, 408 may identify, verify, and capture temporal metadata from video, as well as derive and identify entities from associated time-coded text (for example, closed captioning streams) to verify on-screen characters or entities (e.g., people, places, objects, and the like) and determine logical content segments and/or boundaries and related topics for identification, tagging, and association with audience data components.

These segments may be identified using methods and systems known in the art, such as metadata flags, pixel density transitions, filters, phonetic cues, facial and object recognition, audio recognition, and the like. Further, for text contained within the video, a lexical approach may incorporate tokenization, alignment with existing taxonomies, topic models, and the like. For example, entities such as people, places, and objects may be identified and extracted based on closed-captioning information and audio indexed from the video stream.

Such techniques may also reference existing video, audio, and image libraries which provide information for each identified entity that has appeared in previous broadcasts or episodes of the same programming content, or in other programming content known to the libraries. For example, the libraries may include audio, video, and image information for every news broadcast personality who has appeared in a particular news broadcast in the past. However, the libraries may also include audio, video, and image information for entities sourced from a wide range of content, including television, movies, streaming video and audio, music, books, online content, social media content, and the like. In some embodiments, external or third party libraries and databases may be leveraged for use in these operations, including querying various databases available via a network, such as the internet.

Figure 5A:
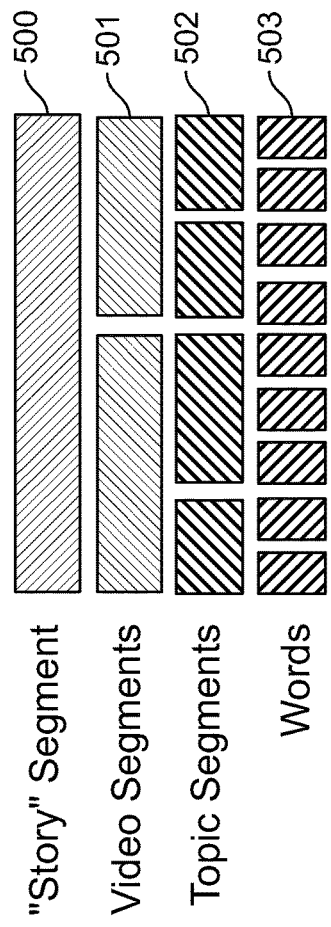
FIGS. 5A and 5B are illustrations showing identified segments of programming content according to embodiments of the present disclosure.

Using combinations of such techniques, the model units may identify segments of video, for example a video of news broadcast, on various levels of granularity, such as story segments, video segments, topic segments, and word segments. FIG. 5A is a representation of identified segments of a programming content video according to one embodiment. As shown, the video may comprise one or more story segments 500 which represent one story or topic discussed during the news broadcast. Each story segment 500 may comprise video segments 501 which represent clips of continuous video that are included in each story segment 500. Further, each video segment 501 may comprise multiple topic segments 502 which represent discussion of particular topics within each video segment 501. Further still, each topic segment 502 is segmented into word or sentence segments 503 which represent the speech or text associated with the discussion or presentation of each topic segment 502.

Figure 5B:
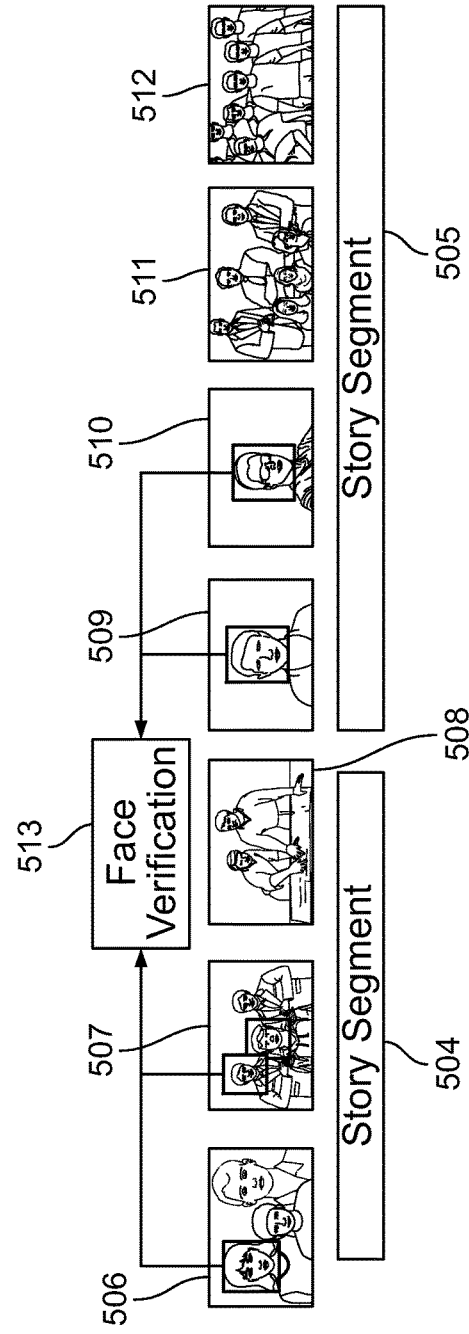

FIG. 5B is an example of a video of programming content broken up into identified story segments 504, 505. The story segments may be identified using the techniques as discussed above, including facial and object recognition, audio recognition, text recognition, content metadata, and the like. Each story segment may correspond to a particular news event being presented during the news broadcast. As shown, the story segment 504 may include video segments 506, 507, 508 and the story segment 505 may include video segments 509, 510, 511, 512. Although shown as a single frame in FIG. 5B, it will be understood that the single frames of video segments such as 506 may represent a portion of video comprising numerous frames. Information regarding previous broadcasts or episodes of the news broadcast may also be leveraged to identify video segments, topic segments, and the like. For example, visual or audio cues used to break up video segments or topic segments for a viewer in previous broadcasts or episodes may be stored and referenced to identify video and topic segments encountered in the present programming content video.

Further as shown in FIG. 5B, face detection or face verification 513 may be leveraged to identify faces that appear within the video segments. Based on the detection times of the faces within the video segments, the topic segments (not depicted) may be identified and tagged. In other embodiments, face detection may be leveraged in combination with other detection methods, such as audio detection, speech recognition, object recognition, text recognition, and the like as previously discussed to identify, tag, and segment the video segments to topic segments. Further as discussed, the topic segments may further be identified and segmented into smaller segments, such as sentence segments, word segments, and the like.

Thus referring back to FIG. 4, model units 406, 407, 408 may be configured to identify content based segments of programming content to leverage, store, and provide content based information to the data normalizer 405. The model units 406, 407, 408 may generate and output temporal metadata based on the analysis of the programming content, including information such as asset information (for example a unique identifier), time-code information (relative position in time within the video), and metadata type information (identifier for segments comprising video, image, audio, text, and the like), related metadata information (for example, secondary data in pair values to describe the video based on detected image, audio, text, and the like).

Referring back to FIG. 4, the predictive models unit 405 may include or be operably coupled to a memory, and be configured to store, generate, and provide historical data related to an aspect of the programming content, audience data, or the metadata. For example, the predictive models unit 405 may store information related to historical audience data for programming content that was previously distributed on the same day of the month, week, or year as the programming content, or was previously distributed at the same time of day as the programming content. This historical audience data may provide information on audience behavior and habits particular to a particular date or time for analyzing and providing a predictive model for the audience data.

For example, the predictive models unit 405 may be provided with information identifying a time slot of 9:00 a.m. on a Monday in September, or other information which may indicate the broadcast time for the programming content. Based on the provided broadcast time, the predictive models unit 405 may provide the data normalizer 405 with audience data for content which was broadcast at 9:00 am on the previous 20 Monday mornings, or audience data for content which was broadcast on the previous eight Monday mornings of September, and the like. This is provided as one example, however in other embodiments the predictive models unit 405 may be configured to provide the data normalizer 405 with audience data for any defined time period or to meet any defined conditions.

For example, the audience data provided by the predictive models unit 405 could include data based on prior seasons of the same programming content, particular broadcasts of the programming meeting certain criteria (season premiere, season finale, special episodes, and the like), particular broadcasts of the programming from a particular time period, and the like. In other examples, the audience data provided may include data which relate to other programming which meet certain criteria, such as programming having similar metadata, similar intended audience, same or similar broadcast days or times, and the like. Some embodiments of the predictive models unit 405 may be configured to receive set conditional filter values, in some cases input by a user of the system, to identify and return audience data to provide to the data normalizer 405.

In other embodiments, the predictive models unit 405 may provide probability models or probability distributions for predicting audience behavior based on various factors. For example, the predictive models may provide that during a 30-minute time slot on Monday at 9:00 am, based on historical models of the same time slot, 4% of impressions may be attributable to seasonality, and 78% of impressions may be attributable to lead-in. Such probability models may provide the data normalizer 405 with information to compare normalized data and perform regression analysis to provide confirmation of output results. The predictive models unit 405 may further be configured to receive and store output results data from the data normalizer 405 for its addition to stored historical data, to update predictive models, and also to provide back to the data normalizer 405 for future programming content analysis.

The visual data models unit 407 may include or be operably coupled to memory, and be configured to store, generate, and provide information related to visual information of the programming content. For example, the visual data models unit 407 may store information based on facial recognition, object recognition, text recognition, movement recognition, prominently displayed colors, and the like, and may also store audience data relative to the stored visual data models information.

For example, the visual data models unit 407 may store historical audience data associated with a particular television personality, including audience tune-out data when the personality is featured on programming content. In another example, the visual data models unit 407 may store historical audience data associated with a particular object such as a landmark or monument, including audience tune-out when the landmark or monument appears on screen, and the like.

The visual data models unit 407 may also be configured to perform visual modeling of the programming content information received from the data aggregator 404 to identify segments within the video based on visual information as previously discussed, as well as leveraging audio, text, and metadata information in combination with visual information. Further the visual data models unit 407 is configured to recognize faces, objects, text, colors, and any other visual information of the programming content according to methods and systems for visual data recognition known to those of ordinary skill in the related art. The content metadata received from the content metadata source 403 may also be used to identify and recognize visual data related to the programming content.

For example, provided with the programming content information and/or the content metadata, the visual data models unit 407 may identify a particular actor that is featured in the content. The visual data models unit 407 may then provide the data normalizer 405 with information related to the actor appearing in the programming content, such as information of the actor, time segments of the programming content during which the particular actor appears, length of time the actor appears, and the like. Further, embodiments of the visual data models unit 407 is further configured to perform facial identification, facial verification using various reference sources, scoring of facial recognition instances, additional training of facial identification using said various reference sources, and the like.

In other embodiments, the visual data models unit 407 may be configured to retrieve historical audience data associated with the particular actor, either from memory included in the visual data models unit 407 or operably coupled thereto. In other embodiments, the historical audience data associated with visual data models may be stored by and retrieved from the predictive models unit 406, or other storage memory. Thus, the visual data models unit 407 may provide information on all previous appearances of the particular actor along with audience data, specifically audience tune-out, at each particular time point during which the actor appears. Thus the historical data may provide context to audience performance data of the current programming content.

Provided with visual data modeling information related to a particular actor and historical audience data associated with the particular actor, the data normalizer 405 may be configured to identify significant changes in the audience data received from the audience data source 401 that is related to the actual content of the programming content, e.g., the appearance of the actor. This identification is able to distinguish, and remove if desired, activity which is driven by random factors not related to the actual content of the programming content being consumed by the user.

As another example, if a particular segment of programming content features a popular singer performing a hit song, the visual data models unit 407 may identify the singer's face and/or body and provide the data normalizer 405 with information on the singer's appearance within the programming content. The data normalizer 405 may also be provided with historical audience data associated with the singer, or the data normalizer 405 may retrieve the historical audience data from the predictive models unit 406 or the visual data models unit 407.

The data normalizer 405 may then associate an increase in tune-out numbers within the audience data to the content of the programming content, specifically the singer's appearance, and generate a content-based indicator to be associated with the increase in tune-out numbers at that particular time point, or alternatively may categorize the increase in tune-out numbers as content-based, specifically associated with the singer's appearance. Similarly, the data normalizer may perform similar operations for an increase in audience retention during the segment of the singer's appearance in the programming content, and generate a content-based indicator to be associated with the increase in audience retention, or alternatively may categorize the increase in audience retention as content-based, specifically associated with the singer's appearance.

Similarly, the language data models unit 408 may include or be operably coupled to a memory, and be configured to store, generate, and provide information related to language and audio information of the programming content. The language data models unit 408 may store information based on audio detection, speech recognition, text recognition, voice recognition, sound analysis, and the like, and may also store audience data relative to the stored language data models information.

For example, the language data models unit 408 may store historical audience data associated with a particular discussion topic, including audience tune-out data when the discussion topic is featured on programming content. In another example, the language data models unit 408 may store historical audience data associated with a particular song within the content, including audience retention loss when the song is played, audience retention gain when the song is played, and the like.

The language data models unit 408 may also be configured to perform language modeling of the programming content information received from the data aggregator 404 to identify and recognize visual text within the content, audible speech, songs, sounds, closed captioning information of the programming content, and the like. The content metadata received from the content metadata source 403 may also be used to identify and recognize language data related to the programming content. For example, this may incorporate components for facilitating tokenizing text of audio as well as phonetic analysis providing a breakdown of unique "speakers" as derived from the audio stream and aligned by time-code and metadata.

This may include speaker diarization which corresponds to the process of partitioning an input audio stream into homogenous segments according the speaker identity and detecting syllable nuclei from the audio stream in order to measure speech rate. These and other recognition operations may be accomplished using methods and systems known to those of ordinary skill in the art, for example speaker recognition and identification system tools in conjunction with phonetics analysis libraries.

Such embodiment would provide temporal metadata for each given episode by identifying a unique speaker, time-code within the episode, syllable count for the corresponding time segment, and average amplitude of the spoken voice for the time segment in decibels. The language data models unit 408 may further identify a main speaker and secondary speakers based on who has the highest percentage of episode time assigned, such as a news anchor speaking for the majority of a news broadcast.

For example, provided with the programming content information and/or content metadata information, the language data models unit 408 may identify a particular political topic that is being discussed during a television talk show. The language data models unit 408 may then provide the data normalizer 405 with information related to the political topic being discussed in the programming content, such as information of the topic, time segments of the programming content during which the topic is discussed, length of time the topic is discussed, identity of the main speaker discussing the topic, volume and tone of voice, inflection of words being used to discuss the topic, average amplitude of the voice, and the like.

In other embodiments, the language data models unit 408 may be configured to retrieve historical audience data associated with the topic, either from memory included in the language data models unit 408 or operably coupled thereto. In other embodiments, the historical audience data associated with language data models may be stored by and retrieved from the predictive models unit 406, or other storage memory.

Similar to the visual data models information discussed above, provided with language data modeling information related to a particular topic being discussed in the programming content and historical audience data associated with the particular topic, the data normalizer 405 may be configured to identify significant changes in the audience data received from the audience data source 401 that is related to the actual content of the programming content, e.g., the discussion of the topic. Conversely, this identification is able to distinguish activity which is driven by more random factors not related to the actual content of the programming content being consumed by the user.

As another example, if a particular segment of programming content features audio of a popular song, the language data models unit 408 may identify the words, tone, melody, beat pattern, audio fingerprint, and the like of the popular song using methods and systems for audio recognition known to those in the art, and provide the data normalizer 405 with information on the song's audio within the programming content. The data normalizer 405 may also be provided with historical audience data associated with the song, or the data normalizer 405 may retrieve the historical audience data from the predictive models unit 406 or the language data models unit 408.

The data normalizer 405 may then associate a audience tune-out to the content of the programming content, specifically the audio of the song (or associated performance of the song by a singer), and generate a content-based indicator to be associated with the decrease in retention numbers at that particular time point, or alternatively may categorize the audience tune-out as content-based, specifically associated with the song's audio. Similarly, the data normalizer may perform similar operations for an increase in audience tune-in during the segment of the song's audio in the programming content, and generate a content-based indicator to be associated with the increase in audience tune-in, or alternatively may categorize the increase in audience tune-in as content-based, specifically associated with the song audio.

Based on the categorization of audience data events, the data normalizer 405 may distinguish between content-driven tune-in or tune-out, non-content-driven tune-in or tune-out, shift in audience data due to seasonality, and the like. This provides for isolated audience data information and the various components that make up the audience data may be identified for a particular programming content and compared to the audience data of comparable programming content.

For each given program, the data normalizer 405 may calculate the content and non-content driven components of the audience data, for example, the sum of minute-to-minute percent losses and gains during content of the program and non-content of the program, or associated with a content-based audience event determined using the inference and predictive models unit, visual data models unit, and the language data models unit. The data normalizer 405 may also calculate rolling statistics throughout the duration of the program, such as the mean and standard deviation for each of the components of the audience data to determine the norm or predicted behavior of the audience for the particular program. The mean and standard deviation for each of the audience data components may be determined over a given number of observations, for example over the last forty broadcasts or episodes of the same program.

In some embodiments, the data normalizer 405 is also configured to normalize and assign standard grades for each component of the audience data using the calculated mean and standard deviation values with respect to comparable programming content, for example content which was broadcast during the same time slot on a different channel. The data normalizer 405 may employ a standardized score analysis over a distribution including the audience data of the comparable programming content.

For example, the data normalizer 405 may determine that the component of the audience data corresponding to content-driven retention loss (sum of minute over minute percent losses by audience tune-out during content) for a particular program was 11%. Standardized over a distribution including the content-driven retention loss of comparable programming content, the data normalizer may assign a z-score of 0.45.

The following is provided as an example for the standardized score analysis. For televised programming content, lead-in audience data may only be available at the first minute (or Minute of Program 1, "MOP" 1=0) for shows preceded by a nationally broadcast program. Therefore, when programming content is preceded by local programming, audience data carried over from the local programming may be included in the tune-in category. To remove variation between programs preceded by local programming or national programming, the lead-in component may be replaced by a "Start" component, which equals the sum of tune-in and lead-in audience data. Based on this, an example of a mathematical representation of the z-score calculation for the start component may be as follows, where r=reach, t=MOP, s=start, u=tune-in, w=switch-in, and d=lead-in:

$$t = 1$$
$$r_1 = \sum u_1 w_1 d_1$$

where $u$ = tune-in, $w$ = switch-in, and $d$ = lead-in $$\downarrow$$
$$S = u_t + d_t$$
$$\downarrow$$
$$Z_S = \frac{S - \mu_S}{\sigma_S}$$

Similarly, examples of mathematical representations of the z-score calculations for changes in retention for content-driven gain (Gc), non-content driven gain (Gn), content-drive loss (Lc), and non-content driven loss (Ln) during the programming content for MOP 2 (after start) through the end of the program's duration (p), may be as follows:

$$2 \le t \le p - 1:$$
$$r_t = f(g_{t,y}, l_{t,y})$$

where $y = c$ (content) or $n$ (noncontent)

$$\downarrow$$

$$G_c = \sum_{t=2}^{p-1} g_{t,c} \quad G_n = \sum_{t=2}^{p-1} g_{t,n} \quad L_c = \sum_{t=2}^{p-1} l_{t,c} \quad L_n = \sum_{t=2}^{p-1} l_{t,n}$$

$$\downarrow$$

$$Z_{G_c} = \frac{G_c - \mu_{G_c}}{\sigma_{G_c}} \quad Z_{G_n} = \frac{G_n - \mu_{G_n}}{\sigma_{G_n}} \quad Z_{L_c} = \frac{L_c - \mu_{L_c}}{\sigma_{L_c}} \quad Z_{L_n} = \frac{L_n - \mu_{L_n}}{\sigma_{L_n}}$$

In some embodiments, the data normalizer 405 may assign a letter grade, referred to herein as a component grade, corresponding to the z-score according to a distribution according to Table 1, below, shown by way of example only:

TABLE 1

| Z-Score | Grade |
|---|---|
| Z > 0.67 | A |
| 0 < Z ≤ 0.67 | B |
| −0.67 < Z ≤ 0 | C |
| Z ≤ −0.67 | D |

The z-scores or corresponding component grades may be output by the data normalizer 405, as discussed further below, and may also be stored in an output database to be associated with the programming content, or various other related data points, including the content metadata, broadcast time, and the like. In some embodiments, the z-scores and/or the component grades may be provided to the predictive models unit 406 for storage and later retrieval.

Figure 6:
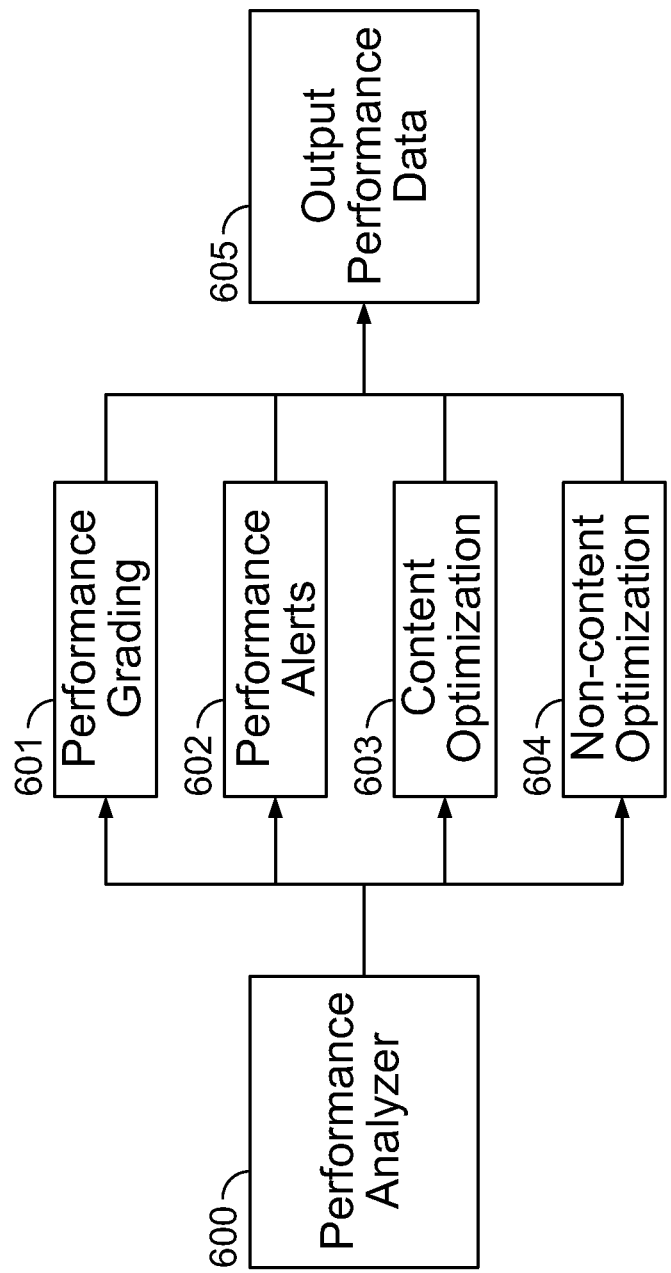
FIG. 6 is an illustration of another aspect of the system for presenting actionable program performance information according to an embodiment of the present disclosure.

Referring now to FIG. 6, the performance analyzer 600 may output normalized audience data, component audience data, z-scores for component audience data, component grades for audience data, and the like. For example, the performance analyzer 600 may output the component grades to the performance grading unit 601. The performance grading unit may include or be otherwise coupled to a memory configured to store the component grade information. The component grade information may be stored in a relational database or other data storage model, and may be associated with information related to the programming content, such as the programming content itself, content metadata, broadcast time, and the like. The performance grading unit may further be configured to output the stored information to an output of performance data 605, which may include an interface, a display, another database for further aggregation and compiling, or a terminal for processing.

The performance analyzer 600 may further output performance alerts based on the normalized audience data or component audience data information. The performance alerts may be generated based on preset rules for alerts, such as a threshold range of variance in content-driven or non-content driven shift in audience data. For example, an alert may be preset to be generated whenever content-driven retention loss exceeds 5% within one minute. Such a drastic change in content-based retention may warrant evaluation of the content of the programming content being presented at that time to cause such retention loss. The performance analyzer 600 may thus generate an alert record, including information logging the details of the programming content, audience data information, broadcast information, and any other information related to the alert event.

The alert event information may be output to the performance alerts unit 602, which may include a memory or otherwise be operably coupled to a memory configured to store alert information. The alert event information may be stored in a relational database or other data storage model, and may be associated with information related to the alert, such as the programming content at the time of the event, audience data, content metadata, and the like. The performance alert unit 602 may further be configured to output the stored information to an output of performance data 605, which may include an interface, a display, audio output, a transmitting unit for transmission, a database for further aggregation and compiling, output to a terminal, or the like.

The performance analyzer 600 may also output content-driven audience data and non-content driven audience data, as well as contextual information to content optimization unit 603 and non-content optimization unit 604, respectively. The content optimization unit 603 may include a memory or otherwise be operably coupled to a memory configured to store information related to the content-driven audience data, programming content, content metadata, visual data modeling and language data modeling information, and the like. The content optimization unit 603 may be configured to store and compile the information, process the information to detect trends, determine probabilities for content-driven audience data, determine predictive models for improving content-driven audience data, and the like. In some embodiments, the content optimization unit 603 may further be configured to output the stored information to an output of performance data 605, which may include an interface, a display, another database for further aggregation and compiling, or a terminal for processing.

For example, the content optimization unit 603 may provide information on how a particular video content discussing a certain news topic can be optimized. Based on an input of the news topic, the content optimization unit 603 may provide audience data component information and/or grades for each news personality who has presented programming content discussing the particular news topic. Accordingly, a content creator may be able to determine which news personality would be received most positively by the audience, and thus optimize the content for audience retention.

As discussed, the audience component information or assigned grades can be based on correlated audience component data with content analysis via facial recognition, voice recognition, speech analysis, text recognition, and the like, as discussed. In another example, the content optimization unit 603 may provide various broadcast times during which the audience retention is the highest for the particular news topic, which may provide actionable performance information to the content creator or distributor to further optimize audience performance of the content. Thus, the performance analyzer 600 may improve functionality of various audience measuring methods and systems of the audience measurement industry, whereby content creators or distributors are provided with actionable program performance information and direction to create or distribute content.

Similarly, the non-content optimization unit 604 may include a memory or otherwise be operably coupled to a memory configured to store information related to the non-content-driven audience data, programming content, content metadata, visual data modeling and language data modeling information, and the like. This information may be to analyzed to determine alterations in non-content to improve audience retention, for example, altering the programming content just prior to commercial breaks or non-content segments to prevent loss in retention of audience data. Accordingly, the non-content optimization unit 604 may provide audience data component information related to non-content factors which affect audience data such as visual graphics, colors, transitions, texts, fonts, various metadata of advertisements such as intended demographic, types of products, style of marketing, MOP of advertisement, and the like.

The non-content optimization unit 603 may be configured to store and compile the information, process the information to detect trends, determine probabilities for non-content-driven audience data, determine predictive models for improving non-content-driven audience data, and the like. In some embodiments, the non-content optimization unit 603 may further be configured to output the stored information to an output of performance data 605, which may include an interface, a display, another database for further aggregation and compiling, or a terminal for processing.

Figure 7:
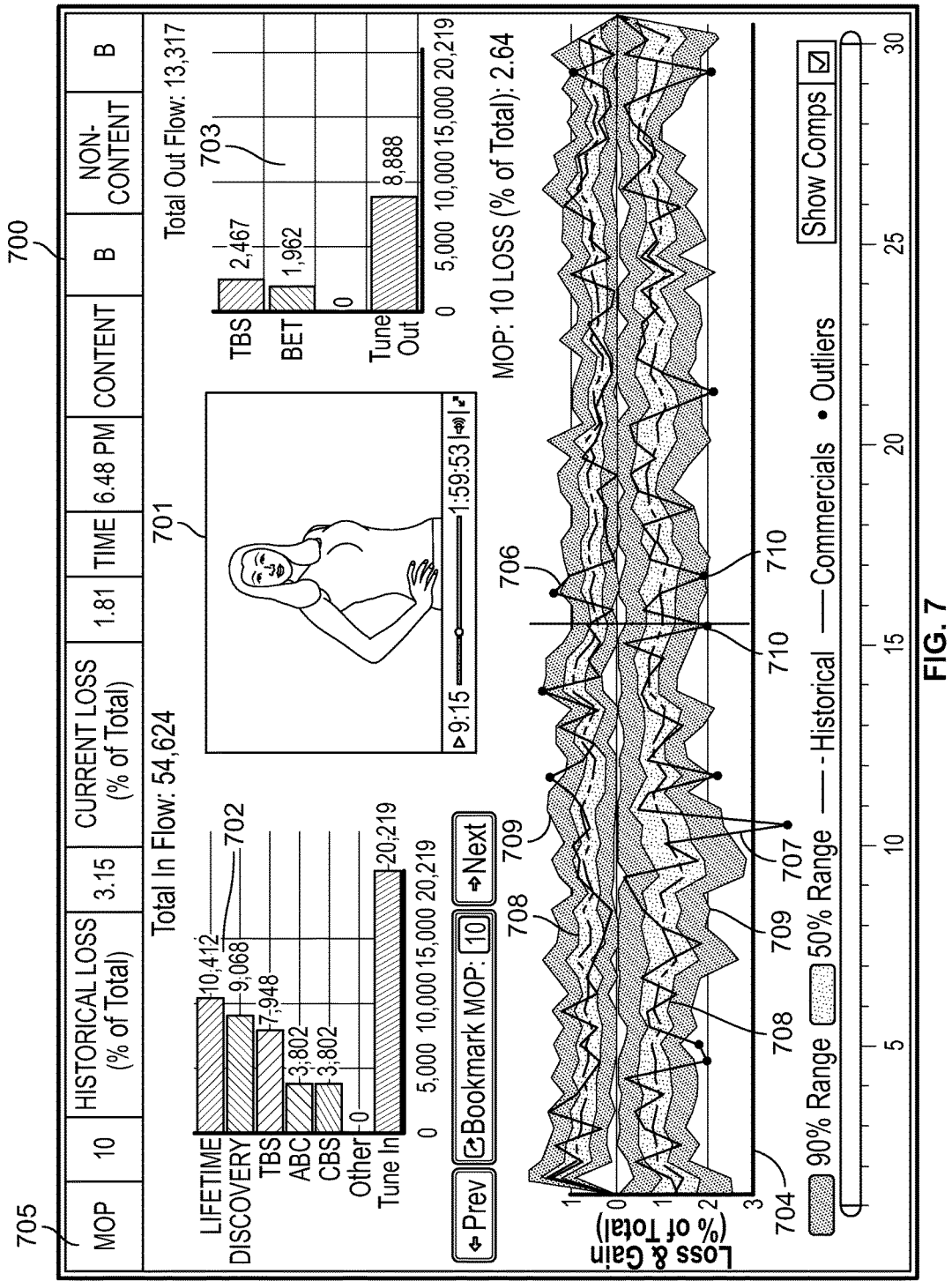
FIG. 7 is an illustration of an interface providing actionable program performance information according to an embodiment of the present disclosure.

Referring now to FIG. 7, an embodiment of output performance data to an interface 700 is shown. In the depicted embodiment, information related to audience data may be displayed in conjunction with the programming content and various representations of audience data components. The interface 700 may include a graphical display of various audience data component information, including content and non-content tune-out data 703 which may provide details on the other programming content that audience viewers switch to when tuning-out from the subject programming content 701. The interface 700 may also include information on tune-in (and switch-in) 702, including details on the other programming content that audience viewers are switching from when tuning-in to the subject programming content 702. The tune-out data 703 and tune-in data 702 may be displayed in a graphical user interface, for example bar graphs as shown in FIG. 7, however other embodiments of displaying the tune-in and tune-out information are contemplated by this disclosure.

The tune-in data 702 and tune-out data 703 may be continually updated to correspond to the current playback position of the programming content 701. Additionally, the interface 700 may include other audience data information or calculated information in additional user interface region 705 which includes MOP, historical audience loss percentage based on inference and predictive models previously discussed, current audience loss percentage, assigned content grade, assigned non-content grade, and the like. The information presented in additional user interface 705 also may be continually updated to correspond to the current playback position of the programming content 701.

The interface 700 may further include a graphical audience progression 704 presenting a progression of audience data component information, such as tune-in (audience gain) 706 and tune-out (audience loss) 707. The audience progression 704 may include information on content or non-content based audience data over time for the programming content, allowing for identification of notable increases or decreases 710 in conjunction with the content related to each data change. The embodiment shown in FIG. 7 shows tune-in and tune-out audience data in the graphical audience progression 704, however in another embodiment, the graphical audience progression 704 may show only one, or in some cases more than two audience data components. The audience progression 704 interface may further be configured to present audience data component information of one or more comparable programming content presented on the same interface for comparison and analysis.

Embodiments of the graphical audience progression 704 may also include visual information on how the current audience progression information compares to historical audience data based on the data generated by the data normalizer as previously discussed. For example, the graphical audience progression 704 may include historical range indicators representing one or more confidence intervals based on the historical data, corresponding to estimates of the audience data for the current audience data of the programming content 701. The graphical audience progression 704 depicts the display of interval ranges corresponding to 50% (708) and 90% (709) confidence intervals for estimation of the current audience data. The interval ranges may also be used to identify significant outliers 710 from the expected historical data.

Thus, outliers falling outside of these historical data based intervals may provide valuable information for identifying important audience data events, such as a large content-based tune-out event. Conversely, this also provides valuable information for evaluating audience data events within the context of historical data, for example, being able to determine that a large tune-out event was to be expected at a particular MOP given historical audience data and thus not cause for concern or alarm for the content creator.

The interface 700 may also be configured to provide instant alignment of data in response to a user input selecting a particular MOP of the programming content 701. For example, a user may select a particular MOP based on the graphical audience progression 704 to view details related to a large drop in audience retention. In response to a user input selecting the particular MOP, either by a selection to the graphical audience progression, drag of a playback progress indicator, manual entry of a particular MOP, or the like as known in the related art, the interface 700 may present the programming content 701, tune-in data 702, tune-out data 703, additional user interface region 705, and the like with updated content and data corresponding to the selected MOP. Thus a user may be able to jump directly to a particular MOP of interest based on a specific point shown by the graphical audience progression 704 or other information, to obtain all related audience data information.

The information presented in interface 700 may thus provide actionable data regarding the audience performance of the programming content. The system may provide direct correlation information, along with visual data and interactive functionality for a content creator to evaluate audience reaction to particular content, such as people, topics, songs, tone of voice, locations, objects, and the like. Based on the actionable performance data, content creators and distributors may optimize content creation or distribution to improve audience data for particular programming content, for example by increasing featured time for particular personalities associated with a strong hold on audience retention, discussing popular topics during longer segments, featuring more popular songs or audio during particular segments, and the like. Content distributors may utilize the actionable data by altering broadcast times, rearranging lineups for particular programming or segments of content, altering the timing of advertising breaks or content, or altering programming content offerings on various channels based on an analysis of the audience data components, such as seasonality, lead-in (or start), content-based retention, or the like.

Figure 8:
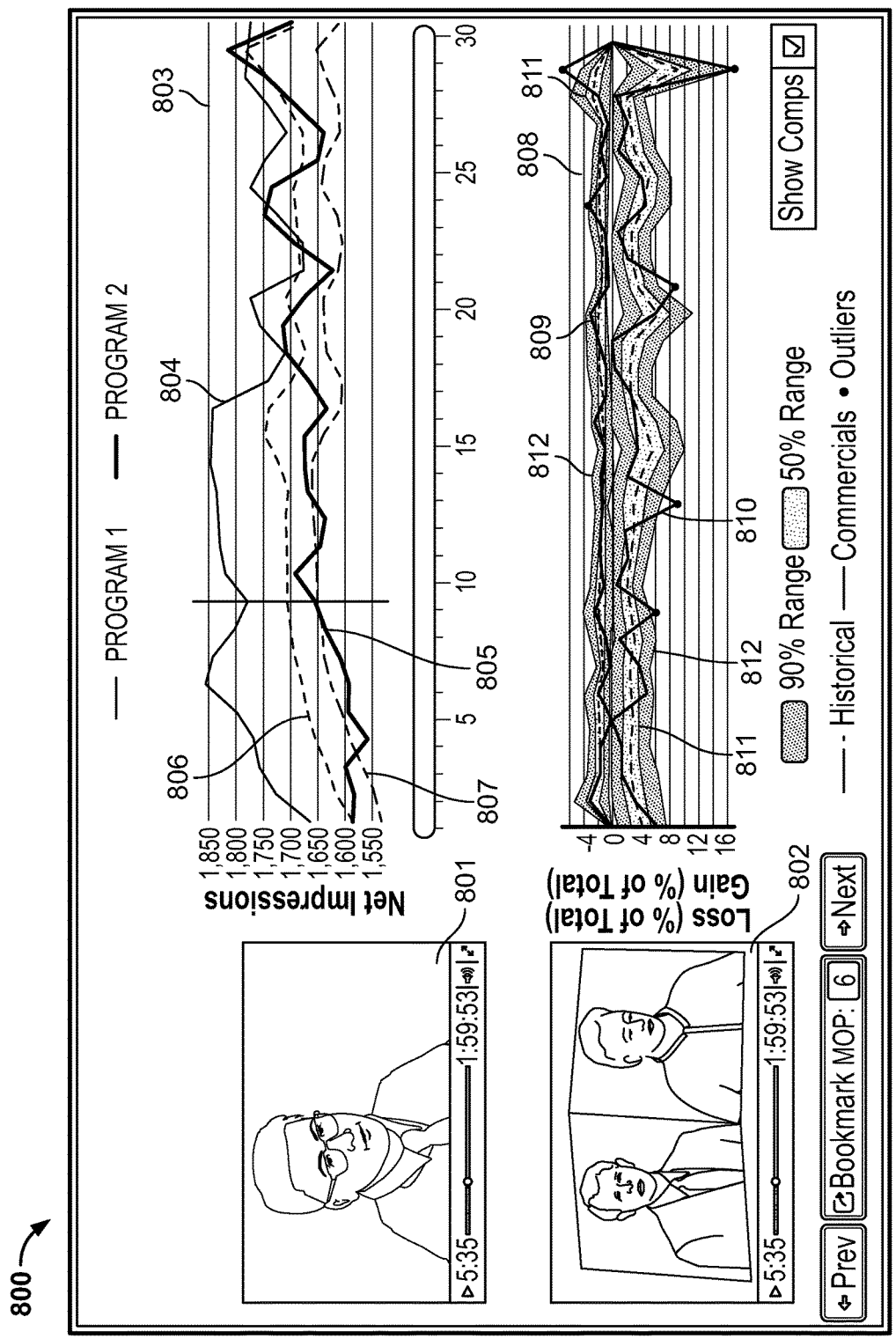
FIG. 8 is an illustration of another interface providing actionable program performance information according to an embodiment of the present disclosure.

FIG. 8 shows another embodiment of output performance data to an interface 800. In the depicted embodiment, two comparable programming content items 801, 802 may be simultaneously displayed for performance comparison. The interface 800 may be configured to present corresponding audience data component information for each of the programming content items 801, 802. For example, corresponding content-based retention audience data may be displayed for each of the programming content items 801, 802 which may have both been broadcast during the same time slot on the same day.

In another example as depicted in FIG. 8, the interface 800 may present one or more audience data component information for one of the programming content items 801, 802. For example, the interface 800 may present an interface 803 including net impressions progression information 804, 805 for the programming content 801 during the broadcast time period. In the example of FIG. 8, the interface 803 may also include graph lines 806, 807 representing the average net impressions corresponding to each programming content 801, 802 to provide additional context for the net impressions information 804, 805.

Additionally, another interface 808 for content or non-content based retention progression information may also be presented corresponding to the programming content 801 or 802, such as tune-in (audience gain) 809 and tune-out (audience loss) 810. The retention progression information interface 808 may include visual information 811, 812 on how the gain and loss progression information compares to historical audience data based on the data generated by the data normalizer as previously discussed. For example, the retention progression information interface 808 may include historical range indicators 811, 812 representing one or more confidence intervals based on the historical data, corresponding to estimates of the current audience data of the programming content 801 or 802. For example, the retention progression information interface 808 depicts the display of interval ranges corresponding to 50% (811) and 90% (812) confidence intervals for estimation of the audience gain and loss data, similar to the interface 700 discussed in FIG. 7.

Each interface 803, 808 may receive various inputs and change the displayed information accordingly. For example, a user input to a particular MOP of interfaces 803 or 808 may cause all information in interface 800 to display corresponding programming content at 801, 802 and corresponding audience data information in interfaces 803, 808 according to the selected MOP. Alternatively, a user input to playback controls of programming content 801, 802 may similarly result in interfaces 803, 808 being changed to correspond to changes in the playback, including a particular selected MOP, playback speed, playback order, and the like. The embodiments of inputs to the interface 800 are not limited to this discussion and it will be understood that various inputs and display features of the interface 800 are considered. For example, other inputs contemplated include zoom-in/zoom-out inputs to various portions of the interfaces 803, 808, bookmarking a particular MOP of interest in programming content 801, 802 or to the interfaces 803, 808, changing the historical intervals 811, 812, presented, displaying or hiding comparable programming content and related audience data, changing the scale or axes of interfaces 803, 808, and the like.

Such an interface embodiment may provide actionable detailed information by presenting content or non-content based audience data in correlation with the actual content of the programming content 801, while additionally presenting a comparable programming content item 802 to evaluate audience movement between programming, shifts in audience viewing due to content, and audience reactions to specific people, objects, topics, audio, and the like.

Figure 9:
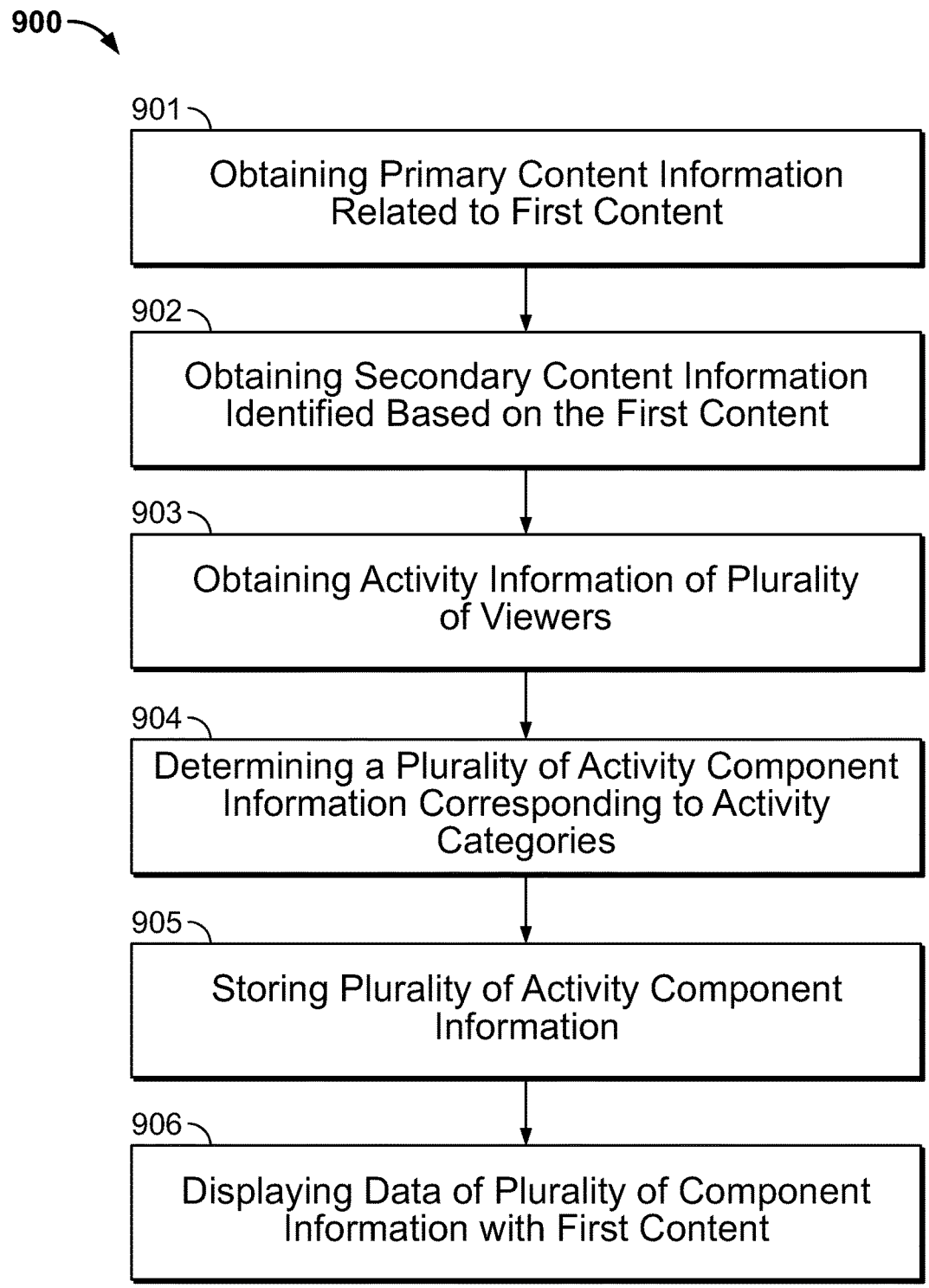
FIG. 9 is an illustration of a method according to an embodiment of the present disclosure.

A method 900 according to an embodiment of the present disclosure is shown in FIG. 9. The embodiment may include obtaining primary content information related to first content at operation 901, wherein the first content is distributed to a plurality of viewers during a particular time duration and the primary content information comprises audio and video of the first content. The method further includes obtaining secondary content information related to the first content 902, wherein the secondary content information comprises information identified based on the first content, and obtaining activity information of the plurality of viewers of the first content during the particular time duration 903.

Further, the embodiment of the method includes normalizing the activity information of the plurality of viewers for each of a plurality of audience components based on the primary content information and the secondary content information 904, storing the normalized activity information for each of the plurality of audience components to be associated with the first content, 905, and displaying data of the normalized activity information of at least one of the plurality of audience components at a first time point within the particular time duration along with a portion of the first content at the first time point 906.

As previously discussed, in some embodiments the performance analyzer may comprise one or more software or hardware computer systems and may further comprise or be operably coupled to one or more hardware memory systems for storing information including databases for storing, accessing, and querying various content, audience data, metadata, and the like. In hardware implementations, the one or more computer systems incorporate one or more computer processors and controllers.

The components of the various embodiments discussed herein may each comprise a hardware processor of the one or more computer systems, and in one embodiment a single processor may be configured to implement the various components. For example, in one embodiment, the predictive data models unit, the visual data models unit, and the language data models unit may be implemented as separate hardware systems, or may be implemented as a single hardware system. The hardware system may include various transitory and non-transitory memory for storing information, wired and wireless communication receivers and transmitters, displays, and input and output interfaces and devices. The various computer systems, memory, and components of the system 300 may be operably coupled to communicate information, and the system may further include various hardware and software communication modules, interfaces, and circuitry to enable wired or wireless communication of information.

Figure 10:
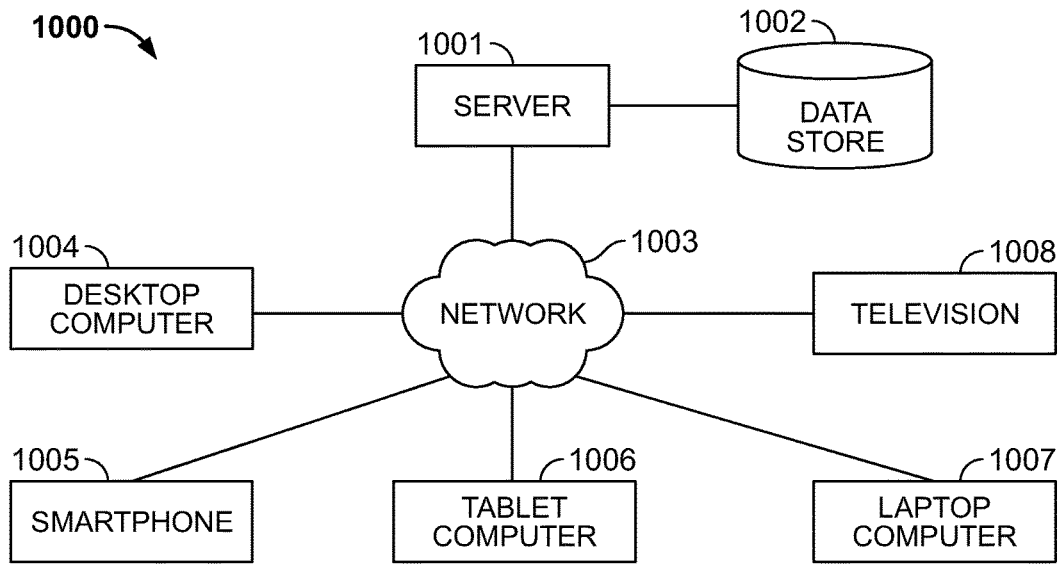
FIG. 10 is an illustration of a computing environment implemented according to an embodiment of the present disclosure.

In selected embodiments, the features and aspects disclosed herein may be implemented within a computing environment 1000 shown in FIG. 10, which may include one or more computer servers 1001. A server 1001 may be operatively coupled to one or more data stores 1002 (e.g., databases, indexes, files, or other data structures). A server 1001 may connect to a data communication network 1003 comprising a local area network (LAN), a wide area network (WAN) (e.g., the Internet), a telephone network, a satellite or wireless communication network, or some combination of these or similar networks.

One or more client devices 1004, 1005, 1006, 1007, 1008 may be in communication with the server 1001, and a corresponding data store 1002 via the data communication network 1003. Such client devices 1004, 1005, 1006, 1007, 1008 may include, for example, one or more laptop computers 1007, desktop computers 1004, smartphones and mobile phones 1005, tablet computers 1006, televisions 1008, or combinations thereof. In operation, such client devices 1004, 1005, 1006, 1007, 1008 may send and receive data or instructions from or to the server 1001, in response to user input received from user input devices or other input. In response, the server 1001 may serve data from the data store 1002, alter data within the data store 1002, add data to the data store 1002, or the like or combinations thereof.

In selected embodiments, the server 1001 may stream or transmit one or more video files including video content, audio content, and/or metadata from the data store 1002 to one or more of the client devices 1004, 1005, 1006, 1007, 1008 via the data communication network 1003. The devices may output video content from the video file using a display screen, projector, or other video output device. For example, the video file may comprise a clip of a movie, television show, live programming, news broadcast, or portion thereof for output using a display device of one or more of the client devices. In certain embodiments, the system 300 configured in accordance with the features and aspects disclosed herein may be configured to operate within or support a cloud computing environment. For example, a portion of, or all of, the data store 1002 and server 1001 may reside in a cloud server.

Figure 11:
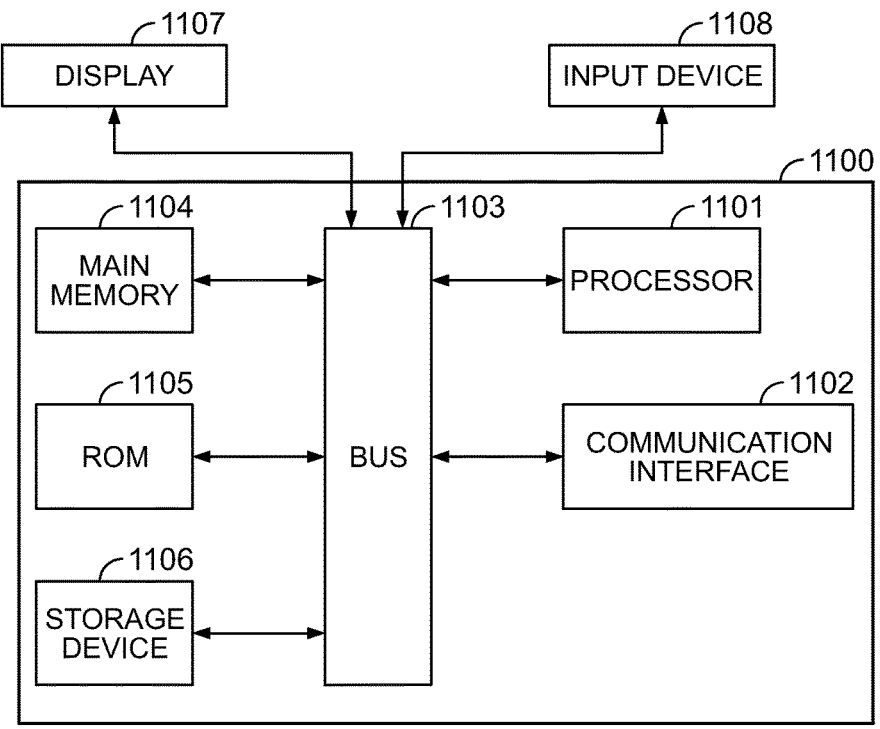
FIG. 11 is an illustration of a computer implemented according to an embodiment of the present disclosure.

Referring to FIG. 11, an illustration of an example computer 1100 is provided. One or more of the devices 1004, 1005, 1006, 1007, 1008 of the system 1000 may be configured as or include such a computer 1100. In selected embodiments, the computer 1100 may include a bus 1103 (or multiple buses) or other communication mechanism, a processor 1101, main memory 1104, read only memory (ROM) 1105, one or more additional storage devices 1106, a communication interface 1102, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 1103 or other communication mechanism, including multiple such buses or mechanisms, may support communication of information within the computer 1100. A processor 1101 may be connected to a bus 1103 and process information. In selected embodiments, a processor 1101 may be a specialized or dedicated microprocessor configured to perform particular tasks in accordance with the features and aspects disclosed herein by executing machine-readable software code defining the particular tasks. Main memory 1104 (e.g., random access memory—or RAM—or other dynamic storage device) may be connected to a bus 1103 and store information and instructions to be executed by a processor 1101. Main memory 1104 may also store temporary variables or other intermediate information during execution of such instructions.

Read only memory 1105 (ROM) or some other static storage device may be connected to a bus 1103 and store static information and instructions for a processor 1101. An additional storage device 1106 (e.g., a magnetic disk, optical disk, memory card, or the like) may be connected to a bus 1103. The main memory 1104, ROM 1105, and the additional storage device 1106 may include a non-transitory computer-readable medium holding information, instructions, or some combination thereof, for example instructions that when executed by the processor 1101, cause the computer 1100 to perform one or more operations of a method as described herein. A communication interface 1102 may also be connected to a bus 1103. A communication interface 1102 may provide or support two-way data communication between a computer 1100 and one or more external devices (e.g., other devices contained within the computing environment).

In selected embodiments, a computer 1100 may be connected (e.g., via a bus) to a display 1107. A display 1107 may use any suitable mechanism to communicate information to a user of a computer 1100. For example, a display 1107 may include or utilize a liquid crystal display (LCD), light emitting diode (LED) display, projector, or other display device to present information to a user of the computer 1100 in a visual display. One or more input devices 1108 (e.g., an alphanumeric keyboard, mouse, microphone) may be connected to a bus 1103 to communicate information and commands to a computer 1100. In selected embodiments, one input device 1108 may provide or support control over the positioning of a cursor to allow for selection and execution of various objects, files, programs, and the like provided by the computer 1100 and displayed by a display 1107.

The computer 1100 may be used to transmit, receive, decode, display, or the like one or more video files. In selected embodiments, such transmitting, receiving, decoding, and displaying may be in response to a processor 1101 executing one or more sequences of one or more instructions contained in main memory 1104. Such instructions may be read into main memory 1104 from another non-transitory computer-readable medium (e.g., a storage device).

Execution of sequences of instructions contained in main memory 1104 may cause a processor 1101 to perform one or more of the procedures or steps described herein. In selected embodiments, one or more processors in a multi-processing arrangement may also be employed to execute sequences of instructions contained in main memory 1104. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by a processor 1101, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 1102 may provide or support external, two-way data communication to or via a network link. For example, a communication interface 1102 may be a wireless network interface controller or a cellular radio providing a data communication network connection. Alternatively, a communication interface 1102 may comprise a local area network (LAN) card providing a data communication connection to a compatible LAN. In any such embodiment, a communication interface 1102 may send and receive electrical, electromagnetic, or optical signals conveying information.

A network link may provide data communication through one or more networks to other data devices (e.g., client devices as shown in the computing environment 1000). For example, a network link may provide a connection through a local network of a host computer or to data equipment operated by an Internet Service Provider (ISP). An ISP may, in turn, provide data communication services through the Internet. Accordingly, a computer 1100 may send and receive commands, data, or combinations thereof, including program code, through one or more networks, a network link, and communication interface 1102. Thus, a computer 1100 may interface or otherwise communicate with a remote server (e.g., server 1001), or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method comprising:
   obtaining primary metadata information related to a first video content, wherein the first video content is viewed by a plurality of viewers during a particular time duration;
   obtaining secondary metadata content information related to the first video content, wherein the secondary metadata content information identifies specific content presented to the plurality of viewers during the first video content;
   obtaining historical audience information based on the primary metadata information and the secondary metadata content information, wherein the historical audience information indicates previous audience activity associated with particular content identified by the primary metadata information or the secondary metadata content information;
   obtaining audience activity information of the plurality of viewers of the first video content during the particular time duration, wherein the audience activity information includes data for audience tune-in and tune-out of the first video content during the particular time duration;
   generating data for a plurality of activity components based on the audience activity information and the historical audience information;
   storing the generated data for the plurality of activity components to be associated with the first video content in a memory; and
   displaying the generated data on a display of at least one of the plurality of activity components at a first time point within the particular time duration along with the first video content at the first time point.

2. The method of claim 1, wherein the plurality of activity factors comprises at least seasonality, lead-in, content-based tune-ins, non-content-based tune-ins, content-based tune-outs, or non-content-based tune-outs.

3. The method of claim 1, wherein the secondary metadata content information comprises at least object recognition information identified from the first video content, facial recognition information identified from the first video content, speech recognition identified from audio of the first video content, or text information identified from the first video content.

4. The method of claim 1, further comprising normalizing at least one of the plurality of activity components relative to corresponding activity components of a plurality of other content distributed during the particular time duration.

5. The method of claim 3, wherein the secondary metadata content information further comprises predictive information related to at least the first video content or the particular time duration.

6. The method of claim 4, further comprising assigning a performance grade to the first video content for each of the plurality of activity factors, wherein each performance grade corresponds to a standard score relative to the plurality of other content.

7. The method of claim 4, further comprising displaying an alert related to the at least one activity component when the activity component includes activity outside of a predetermined threshold activity range.

8. The method of claim 6, further comprising displaying data of normalized activity components for a second video content of the plurality of other content at the first time point along with the second content at the first time point.

9. A system comprising:
   a memory configured to store information;
   a display configured to display information;
   a receiver configured to receive information; and
   one or more controllers configured to:
      obtain primary metadata information related to a first video content via the receiver, wherein the first video content is viewed by a plurality of viewers during a particular time duration;
      obtain secondary metadata content information related to the first video content via the receiver, wherein the secondary metadata content information identifies specific content presented to the plurality of viewers during the first video content;
      obtain historical audience information based on the primary metadata information and the secondary metadata content information, wherein the historical audience information indicates previous audience activity associated with particular content identified by the primary metadata information or the secondary metadata content information;
      obtain audience activity information of the plurality of viewers of the first video content during the particular time duration via the receiver, wherein the audience activity information includes data for audience tune-in and tune-out of the first video content during the particular time duration;
      generate data for a plurality of activity components based on the audience activity information and the historical audience information;
      cause the memory to store the generated data for the plurality of activity components to be associated with the first video content; and
      cause the display to display the generated data of at least one of the plurality of activity components at a first time point within the particular time duration along with the first video content at the first time point.

10. The system of claim 9, wherein the plurality of activity factors comprises at least seasonality, lead-in, content-based tune-ins, non-content-based tune-ins, content-based tune-outs, or non-content-based tune-outs.

11. The system of claim 9, wherein the secondary metadata content information comprises at least object recognition information identified from the first video content, facial recognition information identified from the first video content, speech recognition identified from audio of the first video content, or text information identified from the first video content.

12. The system of claim 9, wherein the one or more controllers are further configured to normalize at least one of the plurality of activity components relative to corresponding activity components of a plurality of other content distributed during the particular time duration.

13. The system of claim 11, wherein the secondary metadata content information further comprises predictive information related to at least the first video content or the particular time duration.

14. The system of claim 12, wherein the one or more controllers are further configured to assign a performance grade to the first video content for each of the plurality of activity factors, wherein each performance grade corresponds to a standard score relative to the plurality of other content.

15. The system of claim 12, wherein the one or more controllers are further configured to output an alert related to the at least one activity component when the activity component includes activity outside of a predetermined threshold activity range.

16. The system of claim 14, wherein the one or more controllers are further configured to output data via a display of normalized activity components for a second video content of the plurality of other content at the first time point along with the second content at the first time point.

17. A method comprising:
displaying a reproduction of first video content with first activity information;
displaying a reproduction of second video content with second activity information;
wherein the first activity information corresponds to a graphical representation of audience retention during a presentation of the first content to a first plurality of viewers and the second activity information corresponds to a graphical representation of audience retention during presentation of the second content to a second plurality of viewers;
wherein the first activity information is generated by:
obtaining primary metadata information related to the first video content, wherein the first video content is viewed by the first plurality of viewers during the presentation of the first video content;
obtaining secondary metadata content information related to the first video content, wherein the secondary metadata content information identifies specific content within the first video content;
obtaining historical audience information based on the primary metadata information and the secondary metadata content information, wherein the historical audience information indicates previous audience activity associated with particular content identified by the primary metadata information or the secondary metadata content information;
obtaining audience activity information of the first plurality of viewers of the first video content, wherein the audience activity information relates to audience retention during the presentation of the first video content; and
generating the first activity information based on the audience activity information and the historical audience information.

18. The method of claim 17, wherein the reproductions of the first video content and the second video content are simultaneously displayed.

19. The method of claim 17, wherein the second video content corresponds to content different from the first video content, and the first video content and the second video content were respectively presented to the first plurality and the second plurality of viewers at the same time.

* * * * *